(12) United States Patent
Kim

(10) Patent No.: US 8,194,268 B2
(45) Date of Patent: Jun. 5, 2012

(54) METHOD OF AND APPARATUS FOR BROADCAST PRINTING VIA A NETWORK

(75) Inventor: Kee-Taek Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1530 days.

(21) Appl. No.: 10/942,845

(22) Filed: Sep. 17, 2004

(65) Prior Publication Data

US 2005/0094197 A1    May 5, 2005

(30) Foreign Application Priority Data

Oct. 18, 2003 (KR) .................. 10-2003-0072792

(51) Int. Cl.
    *G06F 15/00* (2006.01)
(52) U.S. Cl. ........................................ 358/1.15; 358/1.1
(58) Field of Classification Search .................. 358/1.1, 358/1.15, 3, 3.25–3.32, 1.9; 709/247, 223
    See application file for complete search history.

(56) References Cited

U.S. PATENT DOCUMENTS

| 7,298,508 | B2* | 11/2007 | Furukawa et al. | 358/1.15 |
| 2003/0147390 | A1* | 8/2003 | Rizzo et al. | 370/390 |
| 2005/0213545 | A1* | 9/2005 | Choyi et al. | 370/338 |
| 2005/0223410 | A1* | 10/2005 | Li et al. | 725/135 |
| 2008/0095177 | A1* | 4/2008 | Lee | 370/400 |

FOREIGN PATENT DOCUMENTS

| JP | 06-348436 | 12/1994 |
| JP | 11-305966 | 11/1999 |
| JP | 2001-282488 | 10/2001 |
| JP | 2001282472 | * 10/2001 |
| JP | 2001282488 | * 10/2001 |
| KR | 1020030004725 | 1/2003 |
| KR | 1020030019668 | 3/2003 |

* cited by examiner

*Primary Examiner* — King Poon
*Assistant Examiner* — Iriana Cruz
(74) *Attorney, Agent, or Firm* — Roylance, Abrams, Berdo & Goodman, L.L.P.

(57) ABSTRACT

A method and apparatus for broadcast printing via a network are provided. The method and apparatus comprise managing an address list of the clients; determining whether the broadcast printing of data for printing is required; generating a packet including addresses of the clients included in the list if the broadcast printing of the data is determined to be required; transmitting the data to the clients by using the generated packet; and respectively instructing the clients to print the data. Accordingly, since the broadcast printing does not use a group managing protocol, operations for group management and for setting data transmission routes are not required. Moreover, overloads due to data transmission in the network are prevented and data is quickly transmitted.

2 Claims, 3 Drawing Sheets

METHOD OF AND APPARATUS FOR BROADCAST PRINTING VIA A NETWORK

CROSS-REFERENCE TO RELATED APPLICATIONS

This application claims the benefit under 35 U.S.C. §119 (a) of Korean Patent Application No. 2003-72792, filed on Oct. 18, 2003, in the Korean Intellectual Property Office, the entire contents of which are incorporated herein by reference.

BACKGROUND OF THE INVENTION

1. Field of the Invention

The present invention relates to broadcast printing for enabling a user to simultaneously send documents or messages to several destinations and printing the documents or messages through an intranet or the internet at work or school. More particularly, the present invention relates to a method and apparatus for broadcast printing via a network, by which data to be printed is simultaneously transmitted to a plurality of destinations and printed, using an explicit multicast (Xcast) method.

2. Description of the Related Art

In order to simultaneously send data for printing to several destinations and printing the data among devices connected through a network (hereinafter, this indicates broadcast printing), a specific network environment including a server, a router, and a client (e.g., a network printer) is required. The server is a device for controlling connections between computers and other electronic devices in a network or is a personal computer for transmitting data to the router for printing.

The router is a device for connecting separate networks using the same transmission protocol and determining a network route according to a routing table. The router transmits the data received from the server to the client by selecting the most efficient route among several routes. The client interprets the data received from the router, converts it into an image for printing, and then prints the image.

In order to transmit data for printing from the server to a plurality of clients via a network, unicast, broadcast, and multicast methods are used. When the unicast method is used, the server sets up connections to all clients and repetitively transmits data for printing to the respective clients as many times as the number of clients. For instance, if there are 10 clients, the server sets up 10 connections and transmits the data to the respective clients 10 times. Thus, the load on the server and the network is very high.

When the broadcast method is used, the server transmits data for printing once and all clients in the network receive the same data. In this case, the data is also transmitted to clients which do not want to receive the data, and thus, these clients are unnecessarily burdened with receiving unwanted data.

In order to solve this problem, the multicast method is suggested. In the multicast method, the server is able to transmit data for printing only to clients which want to receive the data in the network by using an Internet group management protocol (IGMP). The IGMP is an Internet protocol which allows a computer connected the internet to report its multicast group membership to a nearby router. The multicast method operates based on group addresses and an address area of class D is designated in an Internet protocol (IP) address for the group addresses. When transmitting data, one of the addresses in the class D is set up as a destination address of an IP header.

In order to understand the multicast method, it is assumed that broadcast printing with respect to a group A is performed. First, operations of the server to transmit data for printing will be explained. The server transmits the data to the group A via the router by inserting addresses of the group A into a destination address field of the IP header. Clients, which belong to the group A, register for the group A in advance so as to receive the data and thus the clients send registration messages of the IGMP to the router. The registration message is managed by the router in the network. When the router receives the data which is transmitted from the server to destinations of the group A, it sends the data to destinations, or respective clients, based on information of the group which it manages, and the clients interpret and print the received data.

The multicast method is one of the most efficient methods among the aforementioned methods for transmitting data to a plurality of clients and performing broadcast printing. In this method, the IGMP is used to manage clients who want to print the data. When the clients send the registration messages of the IGMP for broadcast printing to the router, the router receives the registration messages and forms a transmitting tree for data transmitting. In this case, the router performs many operations and the load on the router is high. Therefore, the broadcast printing cannot be done quickly.

SUMMARY OF THE INVENTION

The present invention provides a method of and apparatus for broadcast printing using a network without utilizing an Internet group management protocol (IGMP).

According to an aspect of the present invention, there is provided a method of broadcast printing. The method comprises managing an address list of the clients; determining whether the broadcast printing of data for printing is required; generating a packet including addresses of the clients included in the address list if the broadcast printing of the data is determined to be required; transmitting the data to the clients by using the generated packet; and respectively instructing the clients to print the data.

According to another aspect of the present invention, there is provided an apparatus for broadcast printing. The apparatus comprises an address management unit which manages an address list of the clients; a broadcast printing requirement detecting unit which detects whether the broadcast printing of data for printing is required and outputs a corresponding result as a detection signal; a packet generator which generates a packet including addresses of the clients included in the list by replying to the detection signal and outputs the generated packet; and data transmission unit which transmits the data to the clients by using the generated packet, wherein the data is respectively printed by the clients.

BRIEF DESCRIPTION OF THE DRAWINGS

The above and other features and advantages of the present invention will become more apparent by describing in detail exemplary embodiments thereof with reference to the accompanying drawings in which.

DETAILED DESCRIPTION OF THE PREFERRED EMBODIMENTS

The present invention will now be described more fully with reference to the accompanying drawings in which exemplary embodiments of the invention are shown.

Figure 1:
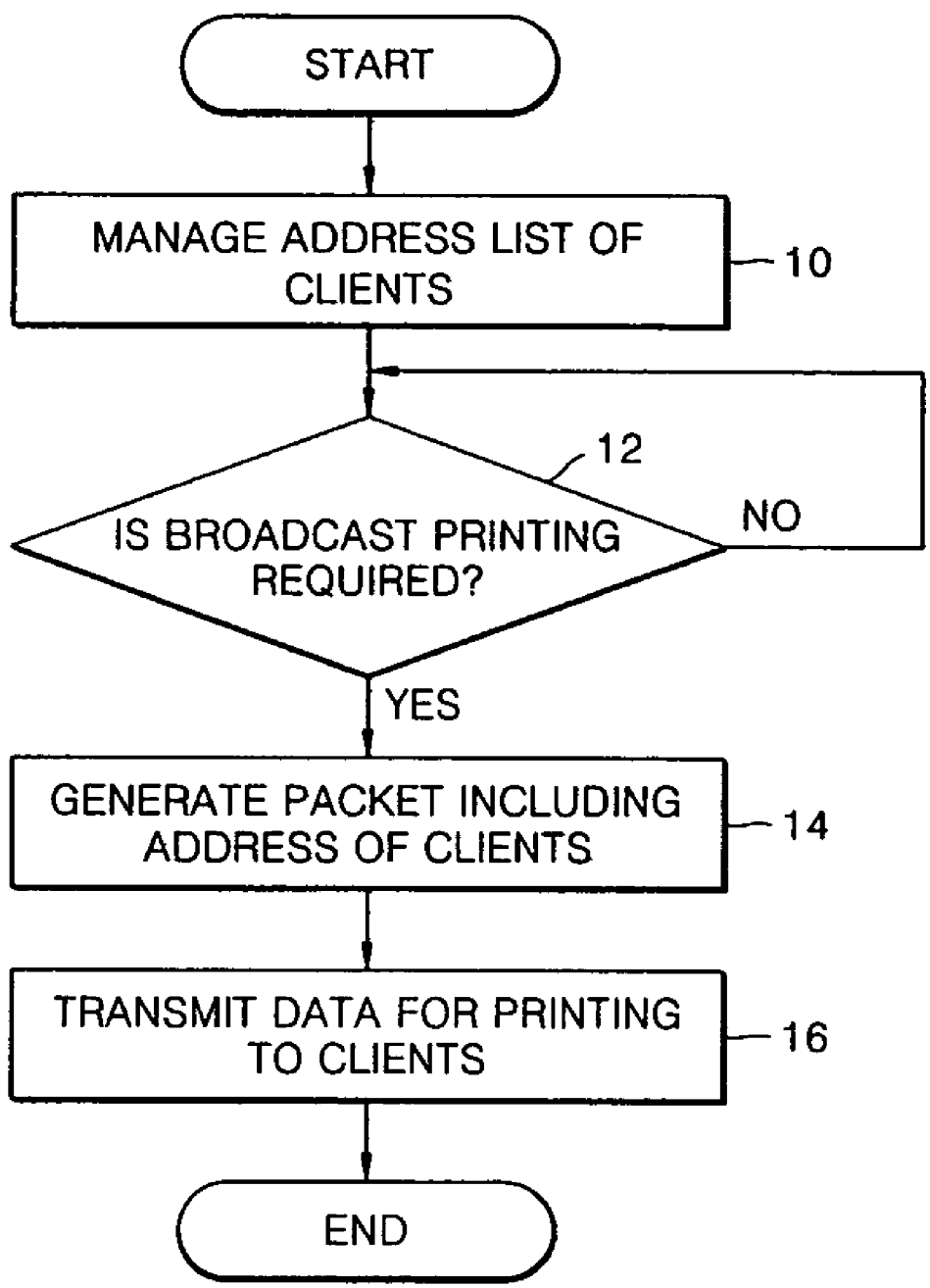
FIG. 1 is a flow chart illustrating broadcast printing using a network according to an embodiment of the present invention.

FIG. 1 is a flow chart illustrating broadcast printing using a network, according to an embodiment of the present invention. Referring to FIG. 1, a packet having addresses of clients is generated according to requirements for broadcast printing, and data which is required to be printed is transmitted to the clients corresponding to the packet in steps 10 through 16.

Specifically, an address list of the clients is managed in step 10. The network comprises a router, a server, and clients. Addresses which are managed in the address list are provided from the clients. When the clients transmit respective registration messages to the server, the addresses of the clients included in the respective registration messages are detected and the address list of the detected addresses of the clients is made and managed. The registration messages are used in the broadcast printing.

In step 12, it is determined whether the broadcast printing of data for printing is required. In this step, if the data which is generated in the server or transmitted from an external device to the server is detected, it is determined that the broadcast printing is required.

If the data is determined to be not required, step 12 is repetitively performed. However, if the data is determined to be required, the packet having the clients' addresses included in the address list is generated in step 14. The address list has address information on the respective clients, which is necessary for broadcast printing. In the packet, the addresses of all clients in the address list are inserted by an explicit mutlicast (Xcast) method. This method allows the addresses of the clients to be included in a conventional IP packet.

Figure 2:
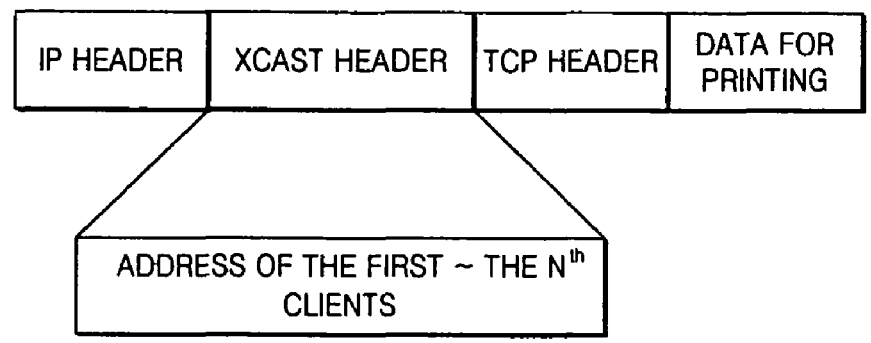
FIG. 2 is a diagram illustrating an example of a packet wherein data for printing is combined.

FIG. 2 is a drawing illustrating an example of a packet wherein data for printing is combined.

Referring to FIG. 2, if first through $n^{th}$ addresses exist in the address list of the clients, they are included in an Xcast header, as shown in FIG. 2.

Referring to FIG. 1, the data is transmitted to the clients by using the generated packet in step 16. The generated packet is transmitted with the data to the router which is connected to the router and then the router interprets the addresses of the clients included in the packet and transmits the data to a next route. Thereafter, the transmitted data is printed by the respective clients.

Figure 3:
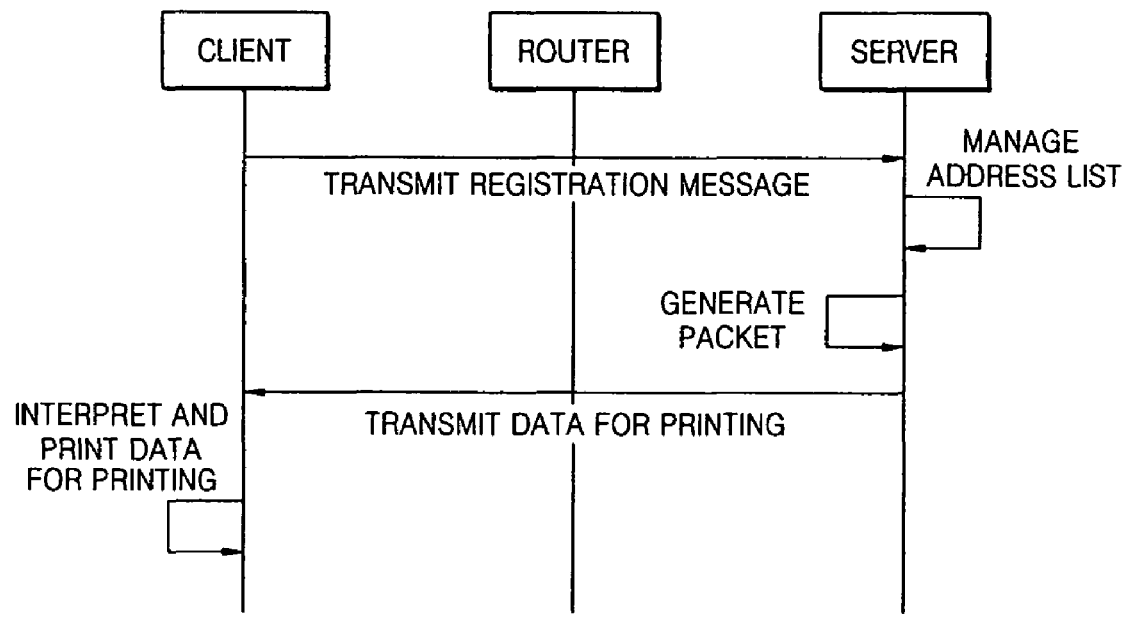
FIG. 3 is a flow diagram illustrating the broadcast printing using the network of FIG. 1.

FIG. 3 is a flow diagram illustrating broadcast printing using the network of FIG. 1. As shown in FIG. 3, when the registration messages are transmitted from the respective clients via the router, the server detects the address information on the respective clients in the registration messages which are received from the respective clients and makes and manages the address list. Thereafter, if the broadcast printing with respect to the data is required, the server generates the packet by using addresses of the respective clients included in the address list and transmits the data and the generated packet to the respective clients via the router. The respective clients convert the data into printable data and prints the data after interpreting the received data.

A broadcast printing apparatus using a network will now be explained.

Figure 4:
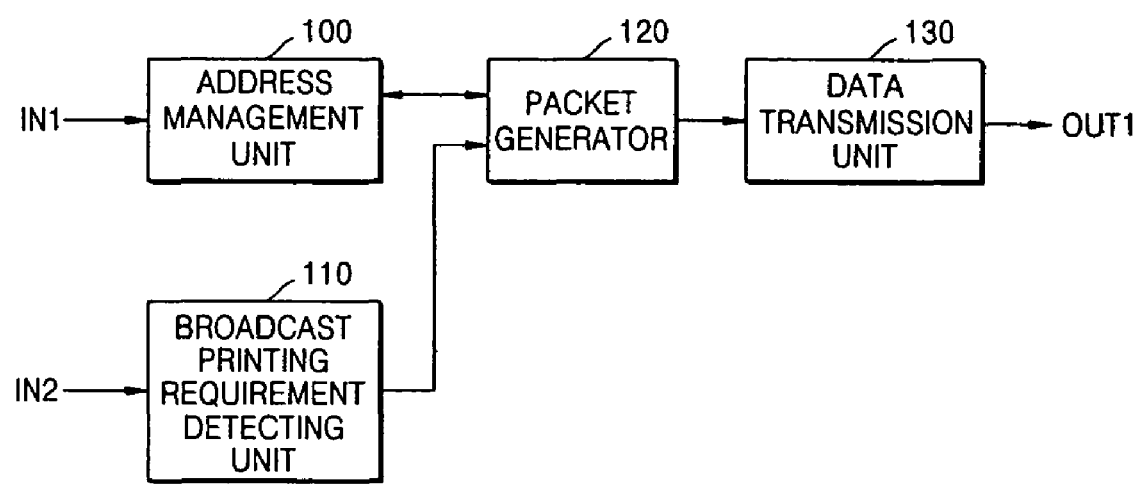
FIG. 4 is a block diagram of a broadcast printing apparatus using a network according to another embodiment of the present invention.

FIG. 4 is a block diagram of a broadcast printing apparatus using a network, according to an embodiment of the present invention. The broadcast printing apparatus using the network is included in a server (not shown).

The broadcast printing apparatus using the network comprises an address list management unit 100, a broadcast printing requirement detecting unit 110, a packet generator 120, and a data transmission unit 130.

The address list management unit 100 manages an address list of clients (not shown) and receives registration messages which are provided from the respective clients at an input terminal IN1. In addition, the address list management unit 100 makes and manages the address list of the clients corresponding to the received registration messages. Moreover, the address list management unit 100 replies to an address requirement signal of the packet generator 120 and outputs address information of the managed address list to the packet generator 120.

The broadcast printing requirement detecting unit 110 detects whether the broadcast printing of the data is required and outputs a result as a detection signal. The broadcast printing requirement detecting unit 110 detects whether the data is generated in the server or the data is provided from an external device by a signal input at an input terminal IN2 and outputs the detection signal to the packet generator 120.

The packet generator 120 generates a new packet including the clients' addresses in a packet transmitted from a transmission layer (not shown) by replying to the detection signal and outputs the generated packet. Specifically, the packet generator 120 transmits an address requirement signal to the address list management unit 100 by replying to the detection signal received from the broadcast printing requirement detection unit 110. Then, the packet generator 120 generates a new packet including the clients' addresses received from the address list management unit 100 and outputs the generated packet to the data transmission unit 130. In order to generate the packet by using the clients' addresses, the packet generator 120 inserts the clients' addresses into the packet by the Xcast method.

The data transmission unit 130 transmits the data using the generated packet to the clients. Specifically, the data transmission unit 130 transmits the packet received from the packet generator 120 and the data to a router (not shown) via an output terminal OUT1. The data transmitted to the router is retransmitted to the respective clients corresponding to the packet which is transmitted with the data.

Then, the clients interpret the data for performing a printing process and respectively print the data received from the router.

As described above, a broadcast printing method and apparatus according to the embodiments of the present invention do not use a group managing protocol and thus operations for group management and for setting data transmission routes are not required. Accordingly, overloads due to data transmission in the network are prevented and data is quickly transmitted.

While the present invention has been particularly shown and described with reference to exemplary embodiments thereof, it should be understood by those of ordinary skill in the art that various changes in form and details may be made therein without departing from the spirit and scope of the present invention as defined by the following claims.

What is claimed is:

1. A method of broadcast printing via using a network, by which data to be printed is simultaneously transmitted to and printed by a plurality of clients connected to the network, the method comprising:

managing, at a server, an address list of the clients;

determining, by the server, whether the broadcast printing of data for printing is required, wherein broadcast printing is determined to be required when data to be printed is received by the server from an external device or data is generated in the server;

generating, by the server, a packet including addresses of the clients, by which the data is to be printed, included in the address list if the broadcast printing of the data is determined to be required;

transmitting the data to the clients by using the generated packet; and respectively instructing the clients to print the data;

wherein the generating step comprises:

inserting the addresses of the clients in the packet by an explicit multicast (Xcast) method, wherein the managing step further comprises:

receiving registration messages to request to join the address list of the clients respectively provided from the clients and managing the address list including the addresses of the clients which correspond to the received registration messages, wherein the registration messages are used in the broadcast printing, wherein the inserting the addresses of the clients comprises inserting the addresses of the clients into the Xcast header of the packet, wherein the generated packet is transmitted with the data to a router, and wherein the addresses of the Xcast header of the packet are interpreted by the router to transmit the data to the clients.

2. An apparatus for broadcast printing via a network, by which data to be printed is simultaneously transmitted to and printed by a plurality of clients connected to the network, the apparatus consisting of a server connected to the network comprising:

an address management unit which manages an address list of the clients;

a broadcast printing requirement detecting unit which detects whether the broadcast printing of data for printing is required and outputs a corresponding result as a detection signal, wherein broadcast printing is determined to be required when data to be printed is received by the server from an external device or data is generated in the server;

a packet generator which generates a packet including addresses of the clients, by which the data is to be printed, included in the list by replying to the detection signal and outputs the generated packet to a data transmission unit; and a data transmission unit which transmits the data to the clients by using the generated packet, wherein the data is respectively printed by the clients, and wherein the packet generator inserts the addresses of the clients in the packet by an explicit multicast (Xcast) method, wherein the address management unit respectively receives registration messages provided from the clients to request to join the address list of the clients and manages the address list including the addresses of the clients which correspond to the received registration messages, wherein the registration messages are used in the broadcast printing, wherein the packet generator inserts the addresses of the clients into the Xcast header of the packet, wherein the generated packet is transmitted with the data to a router, and wherein the addresses of the Xcast header of the packet are interpreted by the router to transmit the data to the clients.

* * * * *